(12) United States Patent
Yamasaki

(10) Patent No.: US 10,292,475 B2
(45) Date of Patent: May 21, 2019

(54) DRAWING APPARATUS AND DRAWING METHOD FOR DRAWING APPARATUS

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 20 days.

(21) Appl. No.: 15/642,268

(22) Filed: Jul. 5, 2017

(65) Prior Publication Data
US 2018/0008025 A1    Jan. 11, 2018

(30) Foreign Application Priority Data

Jul. 5, 2016   (JP) .................. 2016-132974

(51) Int. Cl.
| | | |
|---|---|---|
| *G06K 15/22* | (2006.01) | |
| *A45D 29/00* | (2006.01) | |
| *G06K 15/02* | (2006.01) | |
| *A45D 34/04* | (2006.01) | |
| *A45D 44/00* | (2006.01) | |

(52) U.S. Cl.
CPC ............. *A45D 29/00* (2013.01); *A45D 34/04* (2013.01); *A45D 44/005* (2013.01); *G06K 15/021* (2013.01); *G06K 15/22* (2013.01); *A45D 2029/005* (2013.01)

(58) Field of Classification Search
None
See application file for complete search history.

(56) References Cited

U.S. PATENT DOCUMENTS

| | | | |
|---|---|---|---|
| 5,175,601 A  * | 12/1992 | Fitts .................. | G01B 11/2513 250/237 G |
| 6,286,517 B1 | 9/2001 | Weber et al. | |
| 7,123,983 B2 * | 10/2006 | Yogo ..................... | A45D 31/00 700/182 |
| 8,814,291 B2 * | 8/2014 | Bitoh ..................... | A45D 29/00 347/101 |

(Continued)

FOREIGN PATENT DOCUMENTS

JP          2003534083 A       11/2003

*Primary Examiner* — Ted W Barnes
(74) *Attorney, Agent, or Firm* — Holtz, Holtz & Volek PC

(57) ABSTRACT

Provided is a drawing apparatus including a drawing mechanism configured to perform a drawing on a nail of an object being a finger or a toe, and a processor.
The processor acquires a first captured image of the nail and a second captured image of the nail, the first and the second captured image being images captured from a first direction by an imaging device located at a position along the first direction from a first location of a surface of the nail, the first captured image being an image captured by the imaging device at a position where a distance along the first direction between the imaging device and the first location of the surface of the nail is a first distance, and the second captured image being an image captured by the imaging device at a position where a distance along the first direction between the imaging device and the first location of the surface of the nail is a second distance different from the first distance. Moreover, the processor acquires a value of a width of the nail on the basis of the first captured image and the second captured image.

14 Claims, 8 Drawing Sheets

(56) References Cited

U.S. PATENT DOCUMENTS

| | | | | |
|---|---|---|---|---|
| 9,510,658 B2* | 12/2016 | Nagao | ................... | A45D 29/00 |
| 9,712,727 B2* | 7/2017 | Yamasaki | .............. | H04N 5/225 |
| 2012/0274683 A1* | 11/2012 | Yamasaki | .............. | B41J 3/4073 |
| | | | | 347/2 |
| 2014/0060560 A1* | 3/2014 | Bitoh | ................... | A45D 29/00 |
| | | | | 132/73 |
| 2015/0007841 A1* | 1/2015 | Yamasaki | .............. | A45D 29/00 |
| | | | | 132/73.5 |

* cited by examiner

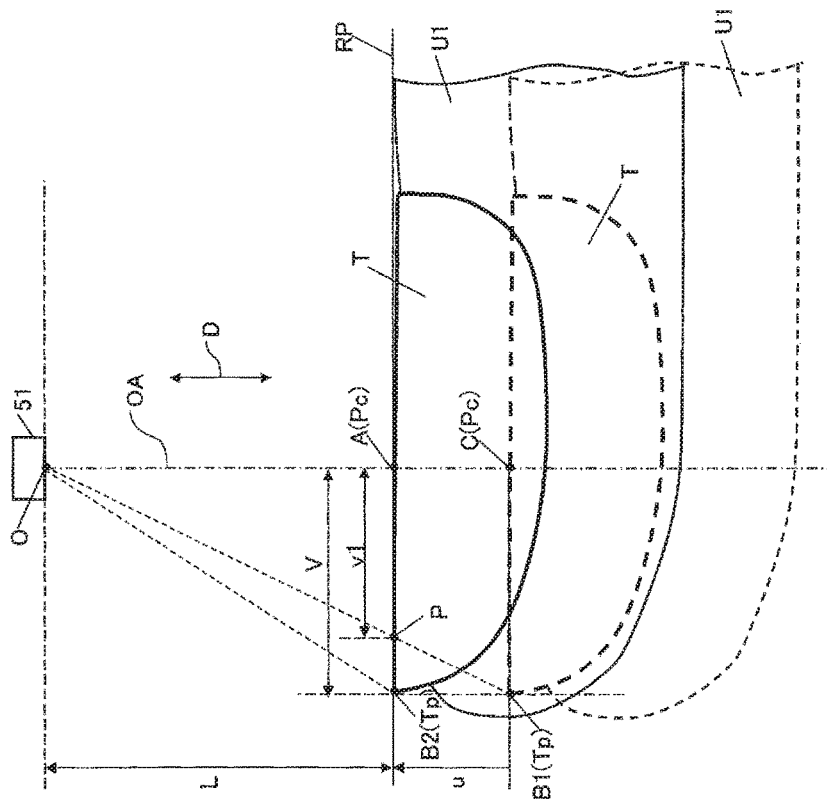
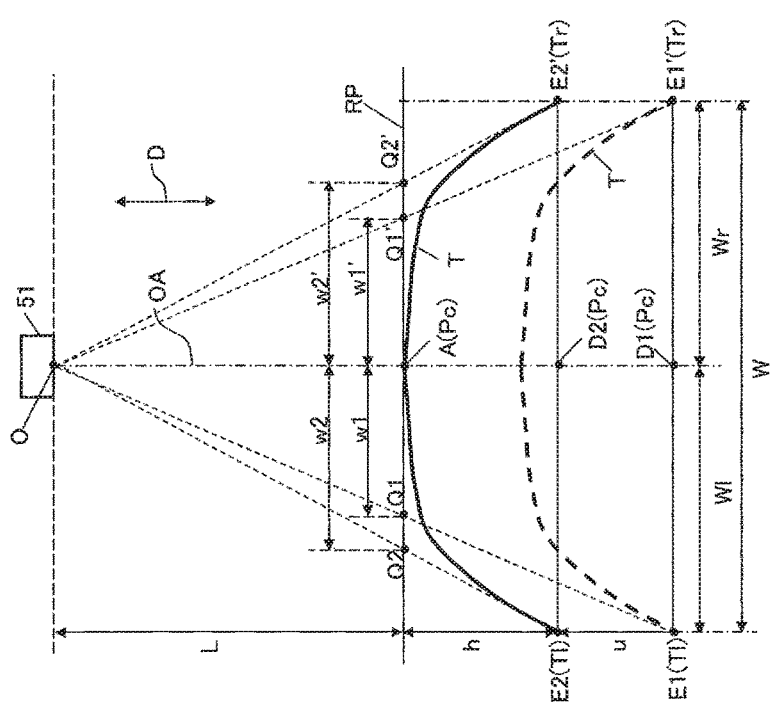
FIG. 5A
FIG. 5B

DRAWING APPARATUS AND DRAWING METHOD FOR DRAWING APPARATUS

CROSS-REFERENCE TO RELATED APPLICATIONS

The present invention contains subject matter related to Japanese Patent No. 2016-132974 filed in the Japanese Patent Office on Jul. 5, 2016, the entire contents of which are incorporated herein by reference.

BACKGROUND ART

1. Field of the Invention

The present invention relates to a drawing apparatus and a drawing method for a drawing apparatus.

2. Description of the Related Art

Conventionally, drawing apparatuses for drawing nail designs on nails are known. An example of such a drawing apparatus is described in Japanese Unexamined Patent Application Publication (Translation of PCT Application) No. 2003-534083.

Nail designs can be enjoyed readily without visiting a nail salon or the like by using such an apparatus.

However, the drawing object of the drawing apparatus for nail printing, namely the nail, has curvature whereby height decreases and inclination increases toward both edges in a width direction thereof.

As such, if a design image is drawn on the nail without taking the curvature into consideration, the design will be distorted and a beautiful finish will not be obtained.

Thus, in order to draw an image that is free of distortion on the nail, curvature correction to fit the drawing data to the curvature of the nail must be performed. However, the degree of curvature in the curvature of nails varies from person to person.

As such, it is not possible to uniformly set a correction value and correct the drawing data but, rather, correction must be performed in accordance with the amount of curvature in the curvature of each nail of the user.

In regards to this, light sectioning methods are known as techniques for measuring three-dimensional shapes of objects. In light sectioning methods, a surface of an object is irradiated with line laser light, the lines formed on the surface of the object by the line light are photographed from a diagonal direction, and a three-dimensional shape (changes in shape in a height direction and the curvature) of the object is acquired on the basis of this image.

However, when the object is a nail, depending on the surface condition and the like of the nail, the laser light may irregularly reflect from the surface of the nail, or light may diffuse and, as a result, the lines formed on the surface of the nail by the line laser light may become blurred. In such cases, it is difficult to accurately measure the three-dimensional shape of the nail by a light sectioning method.

When using such a light sectioning method, an irradiation unit that emits line laser light must be provided in the drawing apparatus. As such, the apparatus may become larger and the weight thereof may increase. Furthermore, conventionally, drawing apparatuses are not equipped with such irradiation units and, as such, increases in costs due to equipping the irradiation unit cannot be avoided.

SUMMARY OF INVENTION

According to the present invention, a drawing apparatus and a drawing method for a drawing apparatus can be provided whereby information indicating the three-dimensional shape of a nail can be acquired with a simple and inexpensive configuration and without providing the drawing apparatus with a special mechanism.

A drawing apparatus according to the present invention whereby the advantageous effects described above are obtained includes a drawing mechanism configured to perform a drawing on a nail of an object being a finger or a toe; and a processor. The processor acquires a first captured image of the nail and a second captured image of the nail, the first captured image and the second captured image being images captured from a first direction by an imaging device located at a position along the first direction from a first location of a surface of the nail, wherein the first captured image is an image captured by the imaging device at a position where a distance along the first direction between the imaging device and the first location of the surface of the nail is a first distance, and the second captured image is an image captured by the imaging device at a position where a distance along the first direction between the imaging device and the first location of the surface of the nail is a second distance different from the first distance. Moreover the processor acquires a value of a width of the nail at the first location of the surface of the nail on the basis of the first captured image and the second captured image.

In a drawing method for a drawing apparatus according to the present invention whereby the advantageous effects described above are obtained, the drawing apparatus includes a drawing mechanism configured to perform a drawing on a nail of an object being a finger or a toe. Additionally, the drawing method includes an image acquisition step of acquiring a first captured image of the nail and a second captured image of the nail, the first captured image and the second captured image being images captured from a first direction by an imaging device located at a position along the first direction from a first location of a surface of the nail, wherein the first captured image is an image captured by the imaging device at a position where a distance along the first direction between the imaging device and the first location of the surface of the nail is a first distance, and the second captured image is an image captured by the imaging device at a position where a distance along the first direction between the imaging device and the first location of the surface of the nail is a second distance different from the first distance; and a value acquisition step of acquiring a value of a width of the nail at the first location of the surface of the nail on the basis of the first captured image and the second captured image.

BRIEF DESCRIPTION OF DRAWING

FIGS. 5A and 5B are explanatory drawings for explaining an apparent distance from one edge in a width direction of the nail to a predetermined position, and an apparent distance from one edge in a length direction of the nail to a predetermined position in captured images captured by the imaging device.

DESCRIPTION OF EMBODIMENTS

Figure 1A:
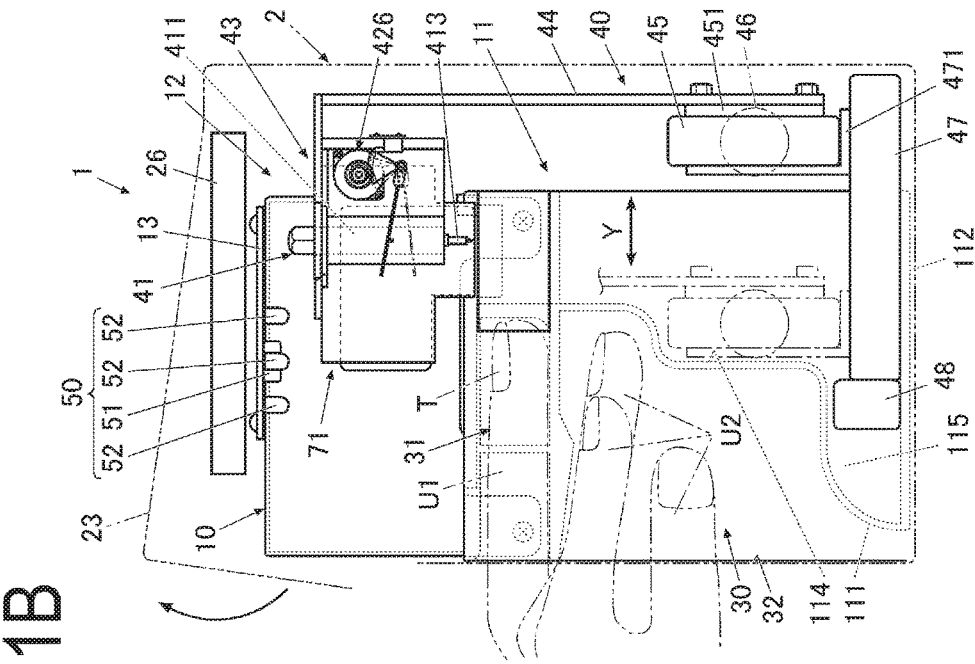
FIG. 1A is a front view of a drawing apparatus according to an embodiment of the present invention.

An embodiment of the nail printing apparatus (drawing apparatus) and drawing method for the nail printing apparatus (drawing apparatus) according to the present invention is described below in detail while referring to the drawings.

While various limitations, which are technically preferable from the perspective of carrying out the present invention, are placed on the embodiment described below, the scope of the present invention should not be construed to be limited to the embodiment or the examples illustrated in the drawings.

Additionally, in the following embodiment, a nail printing apparatus 1 will be described as an apparatus for drawing on a drawing object, namely a fingernail. However, the drawing object of the present invention is not limited to fingernails, and for example, the drawing object may be a toenail.

FIG. 1A is a front view illustrating an internal configuration of the nail printing apparatus 1.

Figure 1B:
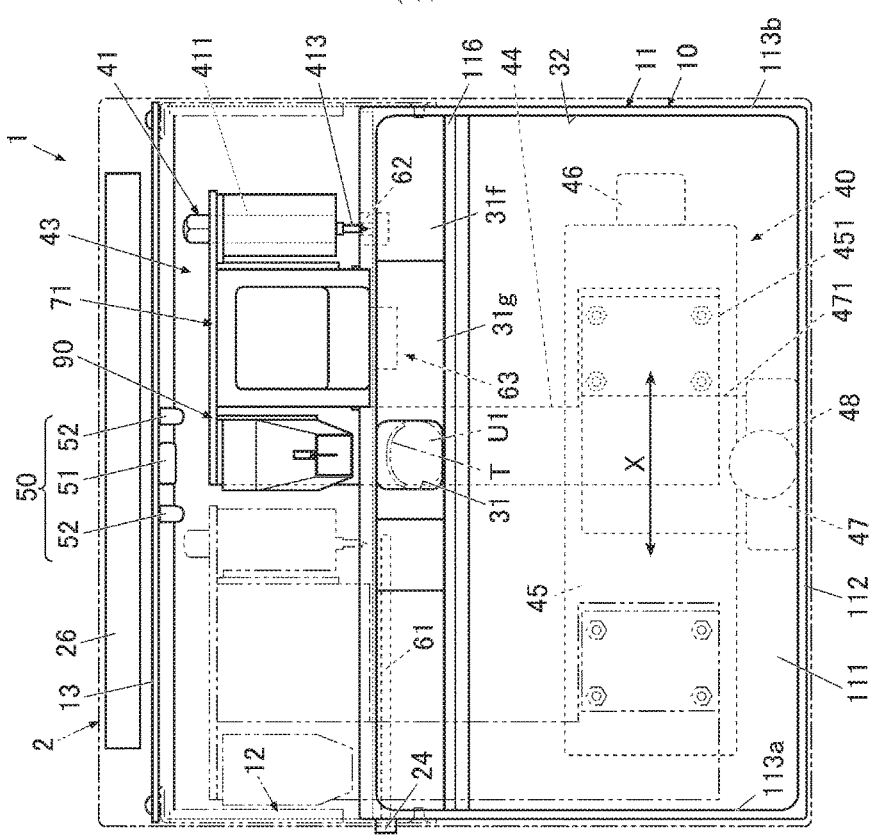
FIG. 1B is a side view illustrating an internal configuration of the drawing apparatus illustrated in FIG. 1A.

FIG. 1B is a side view illustrating the internal configuration of the drawing apparatus illustrated in FIG. 1A.

As illustrated in FIGS. 1A and 1B, in the nail printing apparatus 1 of the present embodiment, a drawing head 43 is provided with drawing tools, namely a pen 41, and an ink jet head 71. The nail printing apparatus 1 of the present embodiment uses plotter printing and ink jet printing to apply a drawing on a nail T.

The nail printing apparatus 1 is provided with a case body 2 and an apparatus main body 10 housed in the case body 2.

As illustrated in FIG. 1B, a cover 23, configured to be openable and closeable, for replacing the pen 41 and the ink jet head 71 of the hereinafter described drawing mechanism 40 is provided on the case body 2 from an upper surface thereof to an upper portion front surface. The cover 23 is rotatable via, for example, a hinge or the like, from a closed state to an open state, as illustrated in FIG. 1B.

An operation unit 25 (see FIG. 3) is set on an upper surface (top panel) of the case body 2.

The operation unit 25 is an input unit where a user performs various types of input.

Operation buttons (not illustrated) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include nail images obtained by imaging the print finger U1 (finger images including images of the nail T), images of the outline or the like of the nail T included in the nail images, design selection images for selecting a design image to be drawn on the nail T, thumbnail images for design confirmation, command screens displaying various commands, and the like.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113a and 113b, an X-direction movement stage housing 114, a Y-direction movement stage housing 115, and a dividing wall 116.

Bottom edges of the side plates 113a and 113b are joined respectively to left and right edges of the bottom plate 112. The side plates 113a and 113b are provided in an upright state on the bottom plate 112.

A lower portion of the back surface plate 111 is formed so as to sink forward (toward the finger insertion direction proximal side) in two stages.

The bottom edge of the back surface plate 111 is joined to a front edge of the bottom plate 112, and the back surface plate 111 divides the area surrounded by the bottom plate 112 and the side plates 113a and 113b into front and back.

The space formed on the back side of the sunken back surface plate 111 becomes the X-direction movement stage housing 114 and the Y-direction movement stage housing 115 (see FIG. 1B).

An X-direction movement stage 45 of the drawing mechanism 40 is housed in the X-direction movement stage housing 114 when the drawing mechanism 40 is moved forward (toward the finger insertion direction proximal side).

A Y-direction movement stage 47 of the drawing mechanism 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113a and 113b).

The dividing wall 116 is provided roughly horizontally, left and right edges of the dividing wall 116 are joined respectively to the side plates 113a and 113b, and a back edge of the dividing wall 116 is joined to the back surface plate 111.

A finger securing portion 30 (see FIG. 1B) is provided integrally in the lower frame 11.

The finger securing portion 30 is configured from a finger receiving portion 31 for receiving the finger corresponding to the nail T (i.e. the drawing object) on which drawing will be performed (hereinafter referred to as "print finger U1"), and a finger clearing portion 32 for clearing fingers other than the print finger U1 (hereinafter referred to as "non-print fingers U2").

The finger receiving portion 31 is disposed on an upper surface of the dividing wall 116, at roughly the center in a width direction of the lower frame 11, for example.

The space on the lower side of the lower frame 11, partitioned by the dividing wall 116, forms the finger clearing portion 32.

For example, in cases where a drawing is performed on the nail T of a ring finger, the ring finger is inserted into the finger receiving portion 31 as the print finger U1, and the non-print fingers U2, namely the other four fingers (thumb, index finger, middle finger, and little finger) are inserted into the finger clearing portion 32.

A user can pinch the dividing wall 116 between the print finger U1 inserted in the finger receiving portion 31 and the non-print fingers U2 inserted in the finger clearing portion 32. Thus, the print finger U1 inserted in the finger receiving portion 31 is stably secured.

Figure 2A:
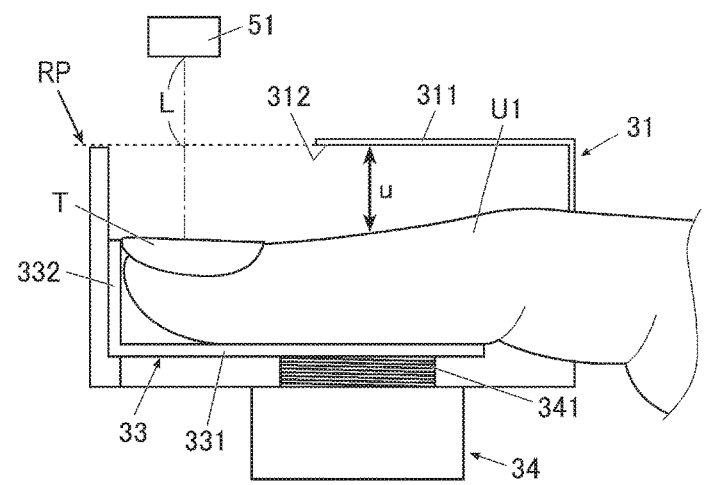
FIG. 2A is an explanatory drawing illustrating a positional relationship between a finger receiving portion and an imaging device when the nail is at a first position.
Figure 2B:
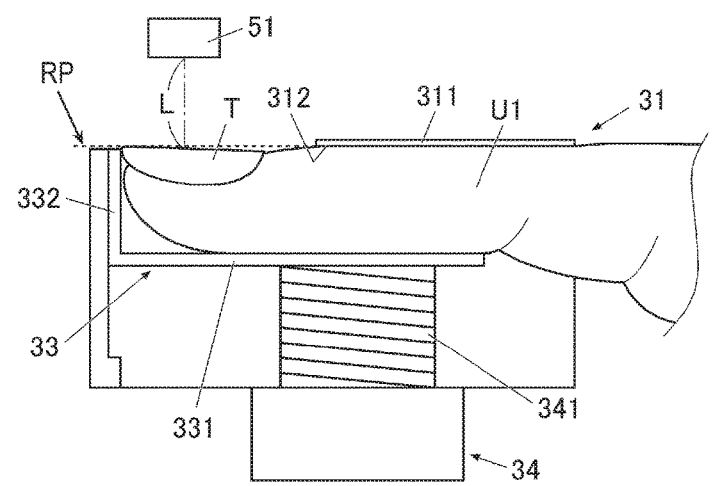
FIG. 2B is an explanatory drawing illustrating a positional relationship between the finger receiving portion and the imaging device when the nail is at a second position.

FIGS. 2A and 2B are schematic side views of the finger receiving portion 31 of the present embodiment, and illustrate positional relationships between the finger receiving portion and the imaging device.

The finger receiving portion 31 has a substantially box-like shape in which the finger insertion direction proximal side of the print finger U1 is open. The finger insertion direction proximal side of the print finger U1 serves as a finger holding portion 311 that positions the print finger U1 in the height direction. When the print finger U1 is pressed up, the top side of the print finger U1 abuts against the bottom surface of the finger holding portion 311.

A cushioning material that is formed from resin or the like may be provided at the portion (that is, the bottom surface of the finger holding portion 311) against which the top side of the print finger U1 abuts.

It is preferable that the cushioning material be provided on the bottom surface of the finger holding portion 311, because the top side of the print finger U1 will be pressed against the cushioning material when the print finger U1 is pressed up to the finger holding portion 311 side, and the user will be less likely to feel impact or pain.

A window 312 is formed in the top surface of the finger insertion direction distal end of the print finger U1, for exposing the nail T of the print finger U1 inserted into the finger receiving portion 31.

As illustrated in FIG. 2B, in the present embodiment, in a state where the top surface of the print finger U1 is abutted against the bottom surface of the finger holding portion 311, the nail T is exposed through the window 312 and, also, the uppermost surface of the nail T is substantially flush with the bottom surface of the finger holding portion 311. Thus, the nail T is disposed at a drawing position where the drawing mechanism 40 performs the drawing on the nail T.

The finger receiving portion 31 includes a finger mount portion 33 where the print finger U1 corresponding to the nail T is mounted, and a lifting mechanism 34 that lifts and lowers the finger mount portion 33.

The finger mount portion 33 is a holding portion which, when the print finger U1 including the nail T is inserted and disposed in the finger receiving portion 31, is capable of holding the print finger U1 at a first position where a distance along a first direction D (e.g. the vertical direction) between a first location (e.g. one location of the uppermost surface of the nail T) of the surface of the nail and a reference position is a first value, and a second position where the distance along the first direction D between the first location of the surface of the nail T and the reference position is a second value different from the first value. Here, the first direction D is a direction along an optical axis OA of a lens of the imaging device 51, as illustrated in hereinafter described FIGS. 5A and 5B.

In the present embodiment, in a case where a recognition reference position RP set by an imaging unit 50 is provided as the reference position at a position separated an imaging distance L in the first direction D from the imaging device 51, the finger mount portion 33 as the holding portion is capable of holding the nail T (the print finger U1 including the nail T) at the first position and the second position where the distances along the first direction D between the recognition reference position RP of the imaging unit 50 (the imaging device 51 of the imaging unit 50) and the first location of the surface of the nail T are mutually different.

In the present embodiment, as illustrated in FIG. 2A, the first position is an initial position for when inserting the print finger U1 into the finger receiving portion 31, where the distance along the first direction D between the imaging device 51 and the first location of the surface of the nail T is greater than the distance along the first direction D between the imaging device 51 and the first location of the surface of the nail T at the second position. That is, the first position is an initial setting position for the holding portion.

As illustrated in FIG. 2B, the second position is a drawing position for when the drawing mechanism 40 performs drawing on the nail T.

The finger mount portion 33 includes a plate member 331 where the print finger U1 is disposed on the XY plane.

The finger mount portion 33 includes a nail placement portion 332 at the finger insertion direction distal side of the print finger U1, on which the free end portion of the nail T is mounted. The nail placement portion 332 positions the nail T by the free end portion of the nail T being mounted on the top surface thereof.

In the present embodiment, the finger mount portion 33 is configured so as to be capable of taking a position where the first location of the surface of the nail T is held at the first position, and a position where the first location of the surface of the nail T is held at the second position, while the nail T is positioned by the nail placement portion 332.

Here, the nail placement portion 332 of the present embodiment is integrated with the plate member 331.

As such, when the lifting mechanism 34 lifts or lowers the finger mount portion 33, the nail placement portion 332 is lifted or lowered in the same manner, and the position of the nail T can be held so as not to become offset.

The lifting mechanism 34 is a push-pull solenoid, for example.

The lifting mechanism 34 includes a plunger 341 that operates along the first direction D (e.g. the vertical direction) in FIGS. 2A and 2B when energized. The holding portion, namely the finger mount portion 33, is lifted and lowered by the vertical movement of the plunger 341.

The operations of the lifting mechanism 34 are controlled by a hereinafter described lifting control portion 813.

Note that the lifting mechanism 34 is not limited to a push-pull solenoid and any mechanism can be used that is capable of lifting and lowering the finger mount portion 33. For example, various types of small motors, actuators, and the like may be applied.

When the finger mount portion 33 is lifted by the lifting mechanism 34 while the print finger U1 is mounted thereon, the print finger U1 mounted on the finger mount portion 33 is pressed upward. The position in the height direction of the print finger U1 is regulated by the top surface of the print finger U1 abutting against the bottom surface of the finger holding portion 311. The nail T is positioned by the free end portion of the nail T being mounted on the nail placement portion 332.

In the present embodiment, the finger mount portion 33 is capable of holding the print finger U1 at at least two locations due to the lifting and lowering operations by the lifting mechanism 34; specifically, the first position that is the initial setting position (see FIG. 2A) and the second position that is the drawing position for when the drawing mechanism 40 performs the drawing on the nail T (see FIG. 2B).

Note that in the present embodiment, the height position of the uppermost surface of the nail T at the second position, that is, the drawing position, is substantially the same as the height position of the recognition reference position RP of the imaging device 51, and the distance along the first direction D from the recognition reference position RP is substantially 0.

A front wall 31f (see FIG. 1A) that closes the front surface side of the lower frame 11 is provided on the top surface of the dividing wall 116, at both end portions on the front surface side of the lower frame 11.

A pair of guide walls 31g (see FIG. 1A) that guides the print finger U1 into the finger receiving portion 31 is erected on the top surface of the dividing wall 116, and the pair of guide walls 31g narrows from the end of the front wall 31f on the center portion side toward the finger receiving portion 31.

A test drawing portion 61 is provided on the top surface of the lower frame 11, beside the finger receiving portion 31 (location corresponding to a media access port 24 of the case body 2, on the left side in FIG. 1A in the present embodiment). The test drawing portion 61 is for performing test drawing to eliminate fading and the like at a time of beginning of drawing by a pen tip (tip portion) 413 of the pen 41 (described hereinafter) within a drawable area of the drawing head 43 (described hereinafter).

Drawing media (not illustrated) that is a flat member and is inserted through the media access port 24 of the case body 2 is mounted on the test drawing portion 61.

The drawing media mounted on the test drawing portion 61 is not limited, provided that test drawing of the pen tip (tip portion) 413 can be performed, and for example, may be a piece of paper.

A pen cap 62 is disposed within a movable range of the drawing head 43 (described hereinafter) on the top surface of the lower frame 11, on a side opposite the test drawing portion 61 across the finger receiving portion 31 (in the present embodiment, the right side in FIG. 1A). The number of the pen cap 62 disposed (one in the present embodiment) corresponds to the number of a pen holder 42 (described hereinafter).

The pen cap 62 is formed, for example, from rubber, and at times when the pen 41 is mounted to the drawing mechanism 40 but not drawing (when not drawing), drying out of the pen tip 413 is prevented by lowering the pen 41 and storing the pen tip 413 in the pen cap 62.

An ink jet maintenance portion 63 is provided at a position corresponding to a position where the ink jet head 71 is disposed when the pen tip 413 is stored in the pen cap 62.

The ink jet maintenance portion 63 is configured from, for example, a hereinafter described cleaning mechanism for cleaning an ink discharging portion (nozzle surface) of the ink jet head 71, a cap mechanism for maintaining moist conditions of the ink discharging portion (nozzle surface), and the like (none of them illustrated in the drawings). Note that the disposal of the pen cap 62, the ink jet maintenance portion 63, and the like is not limited to the examples described herein.

The drawing mechanism 40 is configured from and provided with the drawing head 43, a unit supporting member 44 that supports the drawing head 43, the X-direction movement stage 45 for moving the drawing head 43 in the X direction (the X direction in FIG. 1A; the left-right direction of the drawing apparatus 1), an X-direction movement motor 46, the Y-direction movement stage 47 for moving the drawing head 43 in the Y direction (the Y direction in FIG. 1B; the front-back direction of the drawing apparatus 1), a Y-direction movement motor 48, and the like.

As illustrated in FIGS. 1A and 1B, in the drawing head 43 of the present embodiment, the pen holder 42 holding the pen 41 and an ink jet holder 72 holding the ink jet head 71 are disposed adjacent to each other.

The ink jet head 71 is, for example, an ink cartridge-integrated head in which ink cartridges (not illustrated in the drawings) corresponding to yellow (Y), magenta (M), and cyan (C) ink are formed integrally with an ink discharging portion (not illustrated) provided on a surface (in the present embodiment, the bottom surface in FIG. 1A and the like) facing the drawing object (the nail T) in each of the ink cartridges.

The ink discharging portion is provided with a nozzle array consisting of a plurality of nozzles for spraying each color of ink. The ink jet head 71 performs the drawing by micronizing the ink and spraying the ink from the ink discharging portion directly on the target drawing surface of the drawing object (the nail T).

Note that the ink jet head 71 is not limited to those that discharge the three colors of ink described previously. Ink cartridges holding other ink and ink discharging portions may also be provided.

One pen 41 is mountable in the pen holder 42 of the present embodiment.

The pen 41 is a writing utensil that has the surface of the nail T as its drawing object, and performs a drawing by the tip portion thereof being brought into contact with the drawing object, namely the surface of the nail T.

As illustrated in FIGS. 1A, 1B, and the like, the pen 41 is provided with the pen tip 413 on a tip side (the lower side in FIGS. 1A and 1B) of a rod-like pen shaft portion 411.

An interior of the pen shaft portion 411 is an ink storing portion for storing various types of ink.

Any type of ink can be stored in the interior of the pen shaft portion 411.

Here, viscosity of ink, diameter of the coloring particles (particle size), and the like are not particularly limited. For example, ink containing metallic glitter, white ink, UV-curable ink, ink for gel nails, ink for under coats, ink for top coats, nail varnish, and the like can be used as the ink.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

The pen 41 is held by simply being inserted in the pen holder 42 from above. As such, a user can easily replace the pen 41 by opening the cover 23 provided in the case body 2 and, for example, use hands or tweezers to grab a top end portion of the pen shaft portion 411 and lift the pen 41 out.

Thus, a user can realize a desired nail design by appropriately replacing the pen 41 set in the pen holder 42 with a pen 41 that has a different color or different pen tip 413, or with a pen 41 that uses a different type of ink, depending on the nail design desired to be drawn.

A mechanism for operating the pen 41 such as a pen vertical motor 426 constituted by a stepping motor (see FIG. 3) is provided in the vicinity of the pen holder 42.

The pen 41 is configured to be movable in a Z direction (the Z direction in FIG. 1B; the vertical direction of the nail printing apparatus 1) by the driving of this pen vertical motor 426.

The unit supporting member 44 is fixed to an X-direction movement portion 451 that is attached to the X-direction movement stage 45.

The X-direction movement portion 451 is configured to move in the X direction along guides (not illustrated) on the X-direction movement stage 45 via the driving of the X-direction movement motor 46. Thus, the drawing head 43 that is attached to the unit supporting member 44 is configured to move in the X direction (the X direction in FIG. 1A and the left-right direction of the nail printing apparatus 1).

The X-direction movement stage 45 is fixed to a Y-direction movement portion 471 of the Y-direction movement stage 47.

The Y-direction movement portion 471 is configured to move in the Y direction along guides (not illustrated) on the Y-direction movement stage 47 via the driving of the Y-direction movement motor 48. Thus, the drawing head 43 that is attached to the unit supporting member 44 moves in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and, for example, ball screws and guides (not illustrated).

In the present embodiment, a head movement portion 49 is configured as an XY drive unit that drives the drawing head 43 in the X direction and the Y direction via the X-direction movement motor 46, the Y-direction movement motor 48, and the like.

The pen vertical motor 426, the ink jet head 71, the X-direction movement motor 46, and the Y-direction movement motor 48 of the drawing mechanism 40 are connected to a drawing control portion 816 of a hereinafter described control device 80 (see FIG. 3), and are controlled by the drawing control portion 816.

A dryer 90 is disposed adjacent to a side of the drawing head 43.

In the present embodiment, the dryer 90 is configured to be movable with the drawing head 43 by the head movement portion 49.

The dryer 90 includes a heater 91 (see FIG. 3) for generating heat, and a fan 92 (see FIG. 3) for blowing air. The dryer 90 includes functions of directing wind generated by the fan 92 toward the nail T of the print finger U1 inserted in the finger receiving portion 31 and drying the ink applied on the nail T by the ink jet head 71 or the pen 41.

Note that it is preferable that the dryer 90 have a configuration in which the heater 91 can be switched ON and OFF depending on the application, and the fan 92 can be rotated while the heater 91 is OFF.

Additionally, as illustrated in FIGS. 1A and 1B, the imaging unit 50 is provided on a base plate 13 fixed to the upper frame 12. The imaging unit 50 is provided with the imaging device 51 and an illumination device 52.

Specifically, the base plate 13 is installed on the upper frame 12, and the imaging device 51 and the illumination device 52 are installed on the bottom surface of the base plate 13 at a position substantially above the finger receiving portion 31.

The imaging device 51 is disposed at a position facing the nail T of the print finger U1 inserted into the finger receiving portion 31, and is capable of imaging the nail T of the print finger U1 from above.

It is preferable that the imaging device 51 have, for example, no less than about two million pixels.

The illumination device 52 is, for example, a white light emitting diode (LED) or similar light source.

In the present embodiment, a plurality of illumination devices 52 is disposed near the imaging device 51, and the illumination devices 52 illuminate the nail T of the print finger U1 when the imaging device 51 performs imaging.

Note that the specific disposal and number of the illumination devices 52 provided, and the like are not limited to the examples illustrated in the drawings.

The imaging unit 50 illuminates the nail T of the print finger U1, which is inserted into the finger receiving portion 31 and is exposed through the opening in the upper portion (that is, the window 312), using the illumination devices 52.

Then, the imaging unit 50 images the nail T of the print finger U1 using the imaging device 51 that is provided facing the drawing object, namely the nail T. Thus, captured images of the nail T of the print finger U1, namely nail images (images of the finger including nail images) are acquired.

The imaging device 51 of the imaging unit 50 is provided at a predetermined imaging position and, in cases where the recognition reference position RP of the imaging unit 50 is set at a position separated a predetermined distance along the first direction D (e.g. the vertical direction) from this imaging position, the imaging device 51 acquires a first captured image and a second captured image by imaging the nail T while the nail T is held at the first position and while the nail T is held at the second position from the same imaging position. Here, the distances along the first direction D between the recognition reference position RP and the first location of the surface of the nail T are different for the first captured image and the second captured image. Additionally, in, for example, FIGS. 5A and 5B, a position along the optical axis OA passing through the center of the lens of the imaging device 51 at the imaging position is depicted as a center position O.

Note that the imaging device 51 is disposed at a position where the center position O is along the first direction D from roughly the center in the width direction of the nail T, that is, for example, from roughly the center in the width direction at a maximum width position where the length in the width direction of the nail T is greatest. Specifically, the imaging device 51 is disposed at a position directly above roughly the center in the width direction, at the maximum width position, of the nail T.

In the present embodiment, as illustrated in FIGS. 2A and 2B, the recognition reference position RP of the imaging unit 50 is set at a position separated a predetermined distance (the imaging distance L in FIGS. 2A and 2B) in the vertical direction in FIG. 2A and the like from the imaging device 51.

As described previously, the first position in the present embodiment is the initial setting position of the print finger U1, and the second position is the drawing position for when the drawing mechanism 40 performs the drawing on the nail T.

Moreover, in the present embodiment, the drawing position substantially matches the recognition reference position RP of the imaging unit 50.

Moreover, a hereinafter described nail information acquisition portion 812 acquires the position of the nail T on the XY plane, the outline of the nail T (the shape of the nail T), the length in the width direction of the nail T, the height of the nail T (the position in the vertical direction of the nail T), and other nail information indicating the three-dimensional shape of the nail T, on the basis of the captured images (the nail images) acquired by the imaging by the imaging device 51.

The imaging unit 50 is connected to an imaging control portion 811 of the hereinafter described control device 80 (see FIG. 3), and is configured to be controlled by the imaging control portion 811.

Image data of the images captured by the imaging unit 50 are stored in a nail image memory region 821 (see FIG. 3) of a hereinafter described memory device 82.

The control device 80 is, for example, arranged on the base plate 13 or the like disposed in the upper frame 12.

Figure 3:
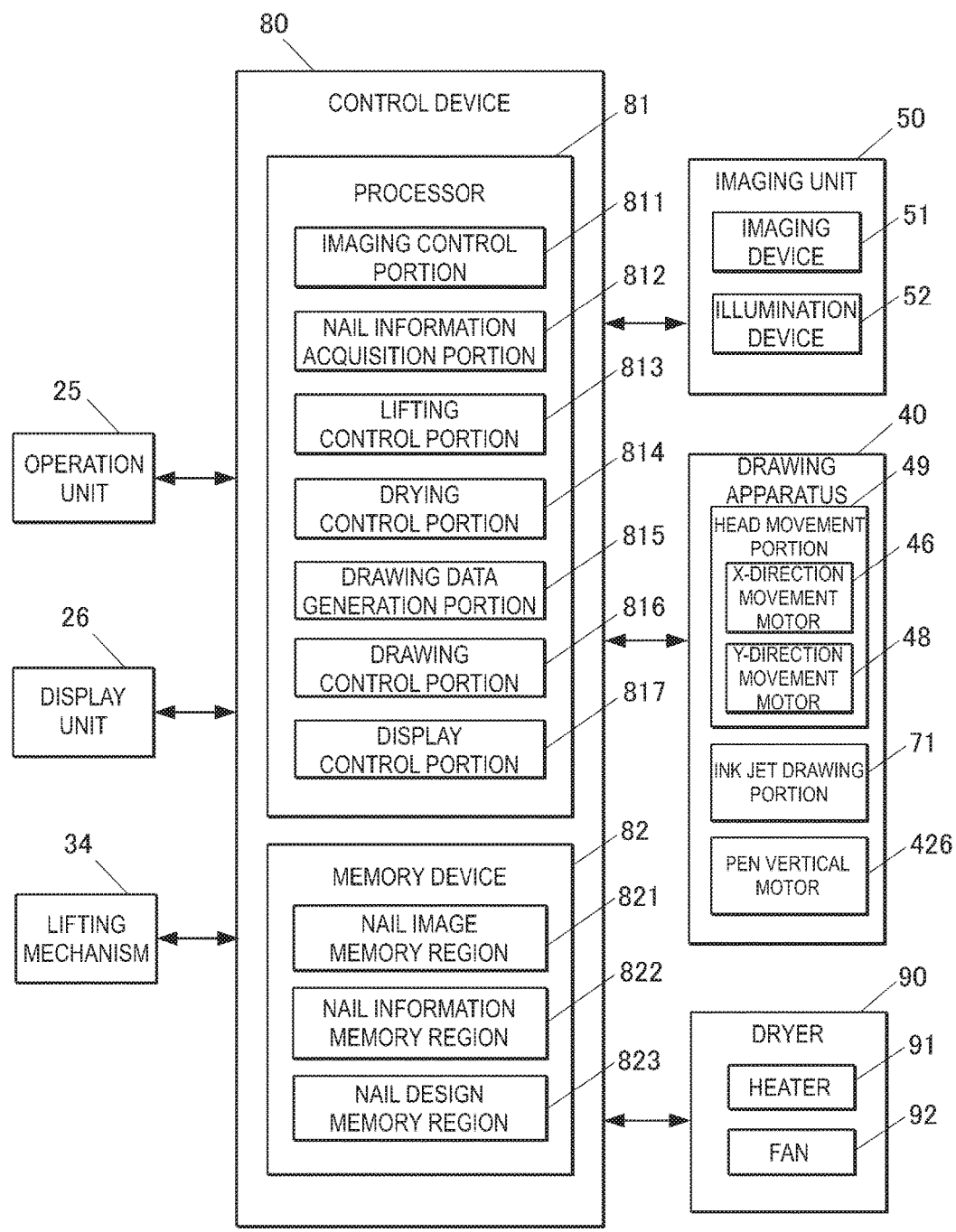
FIG. 3 is a main constituent block diagram illustrating a control configuration of the drawing apparatus according to the embodiment of the present invention.

FIG. 3 is a main constituent block diagram illustrating the control configuration according to the present embodiment.

As illustrated in FIG. 3, the control device 80 is a computer provided with a processor 81 constituted by a central processing unit (CPU) (not illustrated in the drawings), and a memory device 82 constituted by a read only memory (ROM), a random access memory (RAM), and the like (none of them illustrated in the drawings).

Various programs to operate the nail printing apparatus 1, various data, and the like are stored in the memory device 82.

Specifically, various programs are stored in the ROM of the memory device 82 such as a nail information acquisition program for acquiring various types of nail information such as the shape (outline) of the nail T, the curvature in the width direction, the width and length of the nail, and the like from the nail images (the captured images); a drawing data generation program for generating drawing data; and a drawing program for performing drawing processing. These programs are executed by the control device 80 and, thus, the components of the nail printing apparatus 1 are controlled in an integrated manner.

Additionally, in the present embodiment, the memory device 82 is provided with the nail image memory region 821 where the nail image (the captured image) of the nail T of the print finger U1 of a user acquired by the imaging unit 50 is stored, a nail information memory region 822 where the nail information (the shape (outline) of the nail T, the curvature of the nail T, and the like) acquired by a nail information acquisition portion 812 is stored, a nail design memory region 823 where image data of a nail design to be drawn on the nail T is stored, and the like.

When viewed from a function perspective, the processor 81 is provided with the imaging control portion 811, the nail information acquisition portion 812, a lifting control portion 813, a drying control portion 814, a drawing data generation portion 815, a drawing control portion 816, a display control portion 817, and the like. Functions of the imaging control portion 811, the nail information acquisition portion 812, the lifting control portion 813, the drying control portion 814, the drawing data generation portion 815, the drawing control portion 816, the display control portion 817, and the like are realized by cooperation of the CPU of the processor 81 and the programs stored in the ROM of the memory device 82.

The imaging control portion 811 is configured to cause the imaging device 51 to capture finger images, that is, nail images (captured images) including images of the nail T of the print finger U1 inserted into the finger receiving portion 31, by controlling the imaging device 51 and the illumination devices 52 of the imaging unit 50.

In the present embodiment, the imaging control portion 811 controls the imaging unit 50 and causes the imaging device 51 to image the nail T at two positions for which distances along the first direction D between the imaging device 51 and the first location of the surface of the nail T are mutually different, and acquire the first captured image and the second captured image via this imaging.

In the present embodiment, the position of the imaging device 51 when imaging the nail T and acquiring the first captured image and the position of the imaging device 51 when imaging the nail T and acquiring the second captured image are the same. Thus, the imaging control portion 811 causes the imaging unit 50 to image, from the same, fixed imaging position, the nail T held at the first position, that is, the initial setting position (see FIG. 2A) and acquire the first captured image; and also causes the imaging unit 50 to image the nail T held at the second position, that is, the drawing position (see FIG. 2B) and acquire the second captured image.

The image data of the nail image acquired by the imaging unit 50 is stored in the nail image memory region 821 of the memory device 82.

The nail information acquisition portion 812 is configured to acquire nail information on the nail T of the print finger U1 on the basis of the captured images of the nail T of the print finger U1 (that is, the first captured image and the second captured image) inserted into the finger receiving portion 31, captured by the imaging device 51.

In the present embodiment, on the basis of the captured images, the nail information acquisition portion 812 acquires, for example, two-dimensional shapes such as the shape (outline) of the nail T and the XY coordinates of the horizontal position of the nail T as the nail information. Additionally, on the basis of the first captured image and the second captured image, the nail information acquisition portion 812 acquires information indicating the three-dimensional shape of the nail T as the nail information.

In the present embodiment, the nail information acquisition portion 812 acquires values of the width and the height of the nail T on the basis of the first captured image and the second captured image, which have been acquired by the imaging of the nail T by the imaging device 51 at the two positions for which the distances along the first direction D between the imaging device 51 and the first location of the surface of the nail T are mutually different.

More specifically, the nail information acquisition portion 812 acquires, in the first captured image, a position of a first edge in the width direction of the nail T and a position of a second edge in the length direction of the nail T at which the position in the height direction of the nail T is different from the position of the first edge; and acquires, in the second captured image, the position of the first edge of the nail T and the position of the second edge of the nail T. Then, the nail information acquisition portion 812 acquires the actual width and height of the nail T from these acquisition results using a triangulation method.

Specifically, the nail information acquisition portion 812 acquires:

(1) an apparent distance in the first captured image at the recognition reference position RP, from a position of one edge in the width direction of the nail T to a predetermined position; and (2) an apparent distance in the second captured image at the recognition reference position RP, from the position of the one edge in the width direction of the nail T to the predetermined position.

Furthermore, the nail information acquisition portion 812 acquires:

(3) an apparent distance in the first captured image at the recognition reference position RP, from a position of one edge in the length direction of the nail T to a predetermined position; and (4) an apparent distance in the second captured image at the recognition reference position RP, from the position of the one edge in the length direction of the nail T to the predetermined position.

Then, the nail information acquisition portion 812 calculates the actual width of the nail T and height of the nail T using the acquisition results of (1), (2), (3), and (4) using a triangulation method.

A specific method whereby the nail information acquisition portion 812 calculates the actual width of the nail T and height of the nail T in the present embodiment is explained while referencing FIGS. 4A, 4B, 5A, and 5B.

Figure 4A:
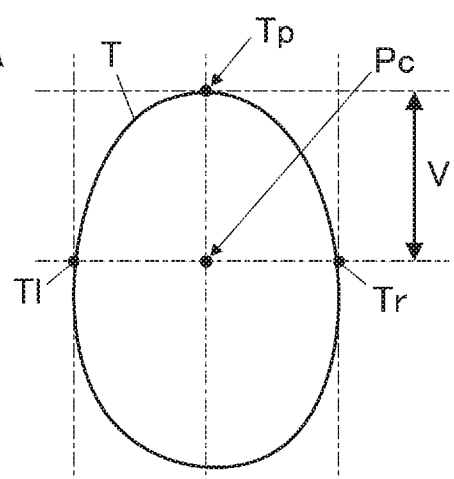
FIG. 4A is a schematic plan view of the nail.
Figure 4B:
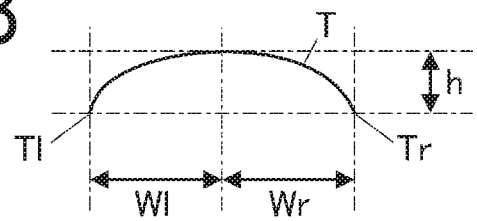
FIG. 4B is a schematic front view of the nail illustrated in FIG. 4A.

FIG. 4A is a schematic plan view of a nail. FIG. 4B is a schematic front view of the nail illustrated in FIG. 4A.

FIGS. 5A and 5B are explanatory drawings for explaining the apparent distance from the position of one edge in the width direction of the nail to the predetermined position, and the apparent distance from the position of one edge in the length direction of the nail to the predetermined position in the captured images captured by the imaging device.

Note that FIG. 5A illustrates a positional relationship in the width direction of the nail T when the nail T is at the first position and the nail T is at the second position; and FIG. 5B illustrates a positional relationship in the length direction of the nail T when the nail T is at the first position and the nail T is at the second position.

The reference sign "V" in FIGS. 4A and 5B denotes the distance from the position of the one edge in the length direction of the nail T to the predetermined position. In the present embodiment, "V" denotes the distance from the free end portion of the nail T (the free end portion Tp of the nail T in FIG. 4A) to an imaging center position Pc (a position where an imaginary line, drawn along the first direction D from the center position O of the imaging device 51, contacts the surface of the nail T; of the position in roughly the center in the width direction at, for example, the maximum width position, of the nail T) of the captured image captured by the imaging device 51.

Note that the free end portion Tp of the nail T in FIG. 4A corresponds to a point B1 in FIG. 5B.

The imaging center position Pc of the captured image captured by the imaging device 51 corresponds to a point A, C in FIGS. 5A and 5B.

Note that in FIGS. 4A and 5B, the distance V in the length direction of the nail T is the distance from the one edge side of the nail T, namely the free end portion Tp, to the imaging center position Pc of the captured image, and is not the length of the entire nail T.

To find the length of the entire nail T, the distance from another edge side in the length direction of the nail T, namely the root side, to the imaging center position Pc of the captured image must be added to the distance V described above.

A distance W1 in the width direction of the nail T in FIGS. 4B and 5A is a distance from a position of the left edge in the width direction of the nail T to a predetermined position and, as illustrated in FIGS. 4A and 4B, represents a distance from a left side edge T1 to a center portion in the width direction of the nail T at, for example, the maximum width position; and a distance Wr in the width direction of the nail T in FIGS. 4B and 5A is a distance from a position of the right edge in the width direction of the nail T to the predetermined position and, as illustrated in FIGS. 4A and 4B, represents a distance from a right side edge Tr to the center portion in the width direction of the nail T at, for example, the maximum width position.

The reference sign "h" in FIGS. 4B and 5A represents a distance in the height direction from the left side edge T1 (the first edge) to the center portion in the width direction of the nail T at, for example, the maximum width position of the nail T. In other words, the reference sign "h" represents the height (depth) of the nail T.

In FIG. 5A, a height position of the left side edge T1 (the first edge) of the nail T is indicated by point E1. The nail T has a curved shape that forms a curved surface and, as such, the left side edge T1 of the nail T is located at a position farther from the imaging device 51 than the free end portion Tp of the nail T.

Note that in FIGS. 4B and 5A, the distance W1 in the width direction of the nail T is the distance from the left side edge T1 of the nail T to roughly the center in the width direction of the nail T, which corresponds to the imaging center position Pc. Additionally, the distance Wr in the width direction of the nail T is the distance from the right side edge Tr of the nail T to roughly the center in the width direction of the nail T, which corresponds to the imaging center position Pc. Thus, a nail width W of the entire nail T is the sum of the distance W1 and the distance Wr.

Note that the distance W1 in the width direction of the nail T is a distance from the position of one edge to roughly the center in the width direction of the nail T and, as such, the shape in the width direction of the nail T is, in general, roughly symmetrical about the center in the width direction. As such, the nail width W of the entire nail T can be found by doubling the distance W1.

In FIG. 5B, the distance V in the length direction of the nail T is expressed as C-B1; and, in FIG. 5A, the distance W1 in the width direction of the nail T is expressed as E1-D1.

Here, an apparent distance w1 in the first captured image at the recognition reference position RP, from the left side edge T1 in the width direction of the nail T to the predetermined position is expressed as Q1-A.

An apparent distance v1 in the first captured image at the recognition reference position RP, from the free end portion Tp (the second edge) of the nail T to the predetermined position is expressed as P-A.

Note that the imaging distance L in FIGS. 5A and 5B, from the imaging device 51 to the recognition reference position RP is a value that is preset in the nail printing apparatus 1, and is commonly known.

Next, the finger mount portion 33 holding the print finger U1 is lifted by the lifting mechanism 34, and the nail T is disposed at the drawing position, that is, the second position, for when the drawing mechanism 40 performs the drawing on the nail T.

The distance that the position of the nail T is lifted at this time is "u" (see FIGS. 5A, 5B, and 2A).

The present embodiment is designed such that, at the drawing position, the free end portion Tp (the second edge) of the nail T is positioned at the recognition reference position RP. As such, when the nail T is disposed at the second position, the free end portion Tp of the nail T is at the position of a point B2.

The distance in the length direction of the nail T acquired from the second captured image captured in this state is the actual distance V in the length direction of the nail T.

At this time, the entire nail T is lifted the distance u and, as such, a height position of the left side edge T1 in the width direction of the nail T is depicted as a point E2.

Here, an apparent distance w2 in the second captured image at the recognition reference position RP, from the left side edge T1 in the width direction of the nail T to the predetermined position is expressed as Q2-A.

Here, the triangle OCB1 and the triangle OAP are similar and, as such, Equation 1 below holds true:

$$L/v1=(L+u)/V \qquad \text{Equation 1}$$

Additionally, the triangle OD1E1 and the triangle OAQ1 are similar and, as such, Equation 2 below holds true:

$$L/w1=(L+h+u)/W1 \qquad \text{Equation 2}$$

Additionally, the triangle OD2E2 and the triangle OAQ2 are similar and, as such, Equation 3 below holds true:

$$L/w2=(L+h)/W1 \qquad \text{Equation 3}$$

Moreover, Equation 4 below can be derived from Equation 1

$$u=L(V/v1-1) \qquad \text{Equation 4}$$

Additionally, Equation 5 below can be derived from Equation 3

$$(L+h)=L^* \, W1/w2 \qquad \text{Equation 5}$$

Additionally, Equations 4 and 5 can be substituted into Equation 2 to obtain
L/w1=(L*W1/w2+L(V/v1−1))/W1, from which Equation 6 below can be derived.

$$W1=w1 \cdot w2 \cdot (VV-v1)/((w2-w1) \cdot v1) \qquad \text{Equation 6}$$

Here, V, v1, w1, and w2 are measurement values that can be acquired from the first captured image and the second captured image.

As described previously, L is a value based on the apparatus side configuration, and is commonly known.

Thus, a value of the distance W1 in the width direction of the nail T can be calculated using the equation above.

Furthermore, by finding the value of the distance W1 in this manner, the height (depth) h of the nail T can be calculated by substituting various numbers for the terms of Equation 3 and Equation 5.

Note that, the distance Wr can also be calculated via the same method described above on the basis of the values of V, v1, w1', and w2' using Equation 7 below:

$$Wr=w1' \cdot w2' \cdot (V-v1)/((w2'-w1') \cdot v1) \qquad \text{Equation 7}$$

Moreover, the actual nail width W of the entire nail T can be found by taking the sum of the distance W1 and the distance Wr.

Note that the distance W1 in the width direction of the nail T is a distance from the position of one edge to roughly the center in the width direction of the nail T, and the shape in the width direction of the nail T is, in general, roughly symmetrical about the center in the width direction. As such, the actual nail width W of the entire nail T may be found by doubling the distance W1.

Note that, to this point, a description has been given of a case in which the center position of the imaging device 51 is disposed at substantially the center in the width direction of the nail T as a result of a user setting the print finger U1 on the finger mount portion 33 of the finger receiving portion 31.

Figure 6A:
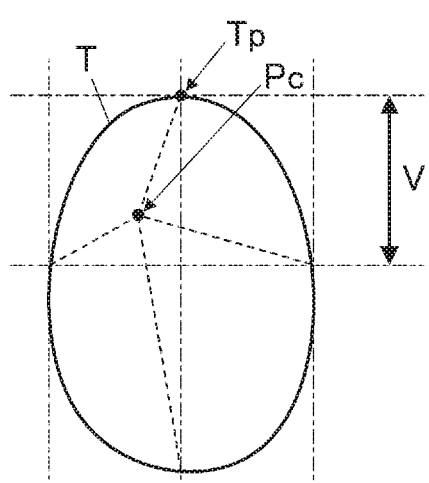
FIG. 6A is a schematic plan view of the nail in a case where a center of the nail is offset from an imaging center of the imaging device.
Figure 6B:
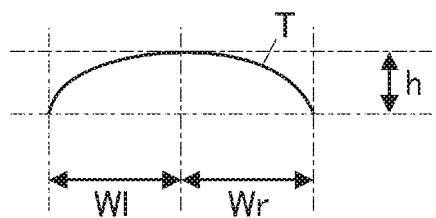
FIG. 6B is a schematic front view of the nail illustrated in FIG. 6A.

However, the center position of the imaging device 51 is not necessarily disposed at substantially the center in the width direction of the nail T. As illustrated in FIGS. 6A and 6B, cases can be conceived in which the center position of the imaging device 51 is disposed at a position offset from the center in the width direction of the nail T.

As described hereinafter, in these cases as well, the numerical deviation caused by positional deviation remains within the error range and does not significantly affect the acquired results of the width of the nail and the height of the nail. As such, there is no problem in calculating in the same manner described above.

Figure 7:
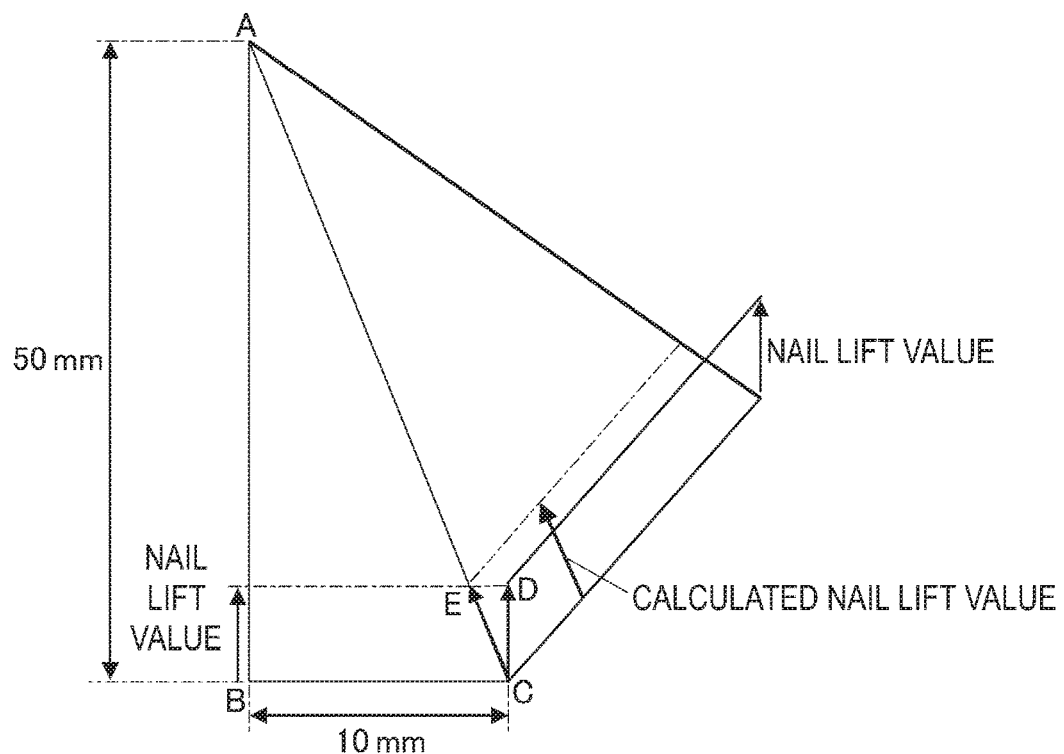
FIG. 7 is an explanatory drawing for explaining an error in a nail lift value in a case where the center of the nail is offset from the imaging center of the imaging device.

FIG. 7 is an explanatory drawing for explaining the degree of deviation that occurs between a calculated lift value of the nail T and an actual lift value of the nail T in a case where the imaging center position Pc is offset from the center position in the width direction of the nail T.

Even in cases where the imaging center position Pc of the imaging device is offset from the center position in the width direction of the nail T as illustrated in FIG. 6A, the maximum length near the center in the width direction of the nail T becomes the distance V in the length direction of the nail T (note that, in the drawing, length of V is not the length of the entire nail T but, rather, is the length from the free end portion of the nail T to near the center of the nail T) and the distance W1 in the width direction of the nail (not the width of the entire nail T but, rather, the width dimension from the left edge of the nail T to near the center of the nail T).

Note that, in the present embodiment, the imaging by the imaging device 51 is performed while the free end portion of the nail T is set on the nail placement portion 332. As such, the offset from the center position of the imaging device 51 to the center position in the width direction of the nail T is about 10 mm at maximum.

As illustrated in FIG. 7, if it is assumed that the distance (height) from the imaging device 51 to the initial setting position at which the first imaging of the nail T is performed is 50 mm, and the nail lift value is 10 mm, the error between the calculated lift of the nail T and the actual lift value of the nail T will be as follows.

Specifically, in FIG. 7, the triangle ABC and the triangle CDE are similar and, as such the following can be derived:

Angle CAB=atan(BC/AB) and

Angle DCE=Angle CAB

Thus, the calculated lift value CE of the nail lift value is found by the following:

CE=nail lift value/cos(Angle CAB), and is about 10.1 mm.

Thus, the calculated lift value of the nail lift value has an error of 0.1 mm per 10 mm of the actual lift value of the nail T, which is within an error range that has no effect at all in actual use.

In a case where the lift value of the nail T is set to 5 mm and the error is calculated in the same manner as described above, the same result is obtained, that is, the error is within a range that has no effect at all in actual use.

Thus, even in cases where the imaging device 51 is offset from the center position in the width direction of the nail T, the width of the nail T, the length in the length direction of the nail T, and the like can be found in the same manner as when the imaging device 51 is not offset from the center position in the width direction of the nail T.

After calculating the height (depth) h of the nail T, the nail information acquisition portion 812 may classify this height h into a plurality of curvature patterns on the basis of predetermined thresholds.

That is, it can be said that larger values of the height (depth) h of the nail T indicate nails T with greater curvature.

Thus, in, for example, a case where classifying into three patterns depending on the degree of magnitude of curvature, when the value of the height (depth) h of the nail T is within a range set as standard values, the nail T is classified as a "medium" curvature pattern; when the value of the height (depth) h of the nail T is greater than the range of standard values, the nail T is classified as a "large" curvature pattern; and when the value of the height (depth) h of the nail T is less than the range of standard values, the nail T is classified as a "small" curvature pattern.

The number of thresholds used when performing the classification by curvature pattern is appropriately set.

The classification is not limited to three patterns, and the nail T may be more finely classified into, for example, five patterns, or the like.

In cases where the nail information acquisition portion 812 classifies the nail T into a plurality of curvature patterns depending on the height (depth) h of the nail T in this manner, curvature correction values for each of the plurality of curvature patterns are stored in advance in the memory device 82 or the like.

Note that the detail acquired by the nail information acquisition portion 812 is not limited thereto.

The nail information acquired by the nail information acquisition portion 812 is stored in the nail information memory region 822 of the memory device 82.

The lifting control portion 813 is configured to control the operations of the lifting mechanism 34, that is, the push-pull solenoid.

In an initial state where drawing operations have not been performed, the lifting control portion 813 controls the lifting mechanism 34 so that the finger mount portion 33 in the finger receiving portion 31 is lowered to a lowest position.

While the finger mount portion 33 is lowered to the lowest position, the print finger U1 can be inserted into the finger receiving portion 31, and the position of the nail T, when the print finger U1 is mounted on the finger mount portion 33 in this state, is the initial setting position.

Then, the first captured image is acquired at this initial setting position. Thereafter, the lifting control portion 813 causes the lifting mechanism 34 to lift the finger mount portion 33 while the print finger U1 is mounted on the finger mount portion 33.

The lifting control portion 813 causes the lifting operations by the lifting mechanism 34 to stop in a state where the top surface of the print finger U1 is abutted against the bottom surface of the finger holding portion 311, and maintain the height of the finger mount portion 33 at this position. The position of the nail T when the print finger U1 is mounted on the finger mount portion 33 in this state is the drawing position at which the drawing mechanism 40 performs the drawing on the nail T.

Next, upon completion of the drawing operations by the pen 41 and/or the ink jet head 71 on the nail T of the print finger U1, the lifting control portion 813 causes the plunger 341 of the lifting mechanism 34 to contract and lower the height of the finger mount portion 33. As a result, a state is achieved where it is possible to pull the print finger U1 out from the finger receiving portion 31.

The drying control portion 814 controls the drying operation of the drying unit 90 and causes drying processing to be performed on the nail T inserted into the finger receiving portion 31 on which the drawing has been applied.

Specifically, the drying control portion 814 appropriately switches the heater 91 and the fan 92 of the dryer 90 ON and OFF. The drying control portion 814 is configured to appropriately perform temperature control of the heater 91 and, as necessary, is capable of turning the heater 91 OFF and only causing the fan 92 to operate.

The drawing data generation portion 815 generates drawing data for performing the drawing by the drawing head 43 on the nail T of the print finger U1, on the basis of the nail information acquired by the nail information acquisition portion 812.

Specifically, on the basis of the shape (contour shape), nail width W and distance V in the length direction of the nail T, and the like acquired by the nail information acquisition portion 812, the drawing data generation portion 815 performs calibration processing (fitting processing), such as enlarging, reducing, and cropping, for fitting the image data of the nail design to the shape of the nail T.

The drawing data generation portion 815 further performs appropriate curvature correction on the image data of the nail design specified to be drawn on the nail T, in accordance with the height (depth) h of the nail T acquired by the nail information acquisition portion 812 and the curvature of the nail T derived from this value.

For example, in a case where, as described above, the nail information acquisition portion 812 classifies the curvature of the nail T into a plurality of curvature patterns depending on the height (depth) h of the nail T, the drawing data generation portion 815 reads, from the memory device 82 or the like, the curvature correction value corresponding to the specific curvature pattern among the plurality of curvature patterns which result from the classification of the curvature, and performs curvature correction of the image data by applying this correction value.

As a result, drawing data for the drawing of the nail design to be drawn by the pen 41 or the ink jet head 71 is generated.

The drawing control portion 816 outputs control signals to the drawing mechanism 40 on the basis of the drawing data generated by the drawing data generation portion 815, and controls the X-direction movement motor 46, the Y-direction movement motor 48, the pen vertical motor 426, the ink jet head 71, and the like of the drawing mechanism 40, so as to perform a drawing on the nail T that corresponds with the drawing data.

Specifically, the drawing control portion 816 controls the operations of the pen vertical motor 426 such that, when not drawing, a state is maintained in which the tip portion (the pen tip 413) of the pen 41 is raised to a height at which the pen tip 413 is not in contact with the surface of the nail T; and when drawing, the tip portion (the pen tip 413) of the pen 41 is lowered to a height at which the pen tip 413 is in contact with the surface of the nail T.

The drawing control portion 816 causes the drawing head 43 to move in the X direction and the Y direction according to the drawing data by causing the X-direction movement motor 46 and the Y-direction movement motor 48 to operate according to the drawing data and, as a result, performs the drawing on the nail T.

The display control portion 817 is configured to control the display unit 26 and cause the display unit 26 to display various types of display screens.

In the present embodiment, examples of the various display screens the display control portion 817 is configured to display on the display unit 26 include nail design selection screens, thumbnail images for confirming designs, nail images acquired by imaging the print finger U1, various command screens, operation screens, and the like.

Figure 8:
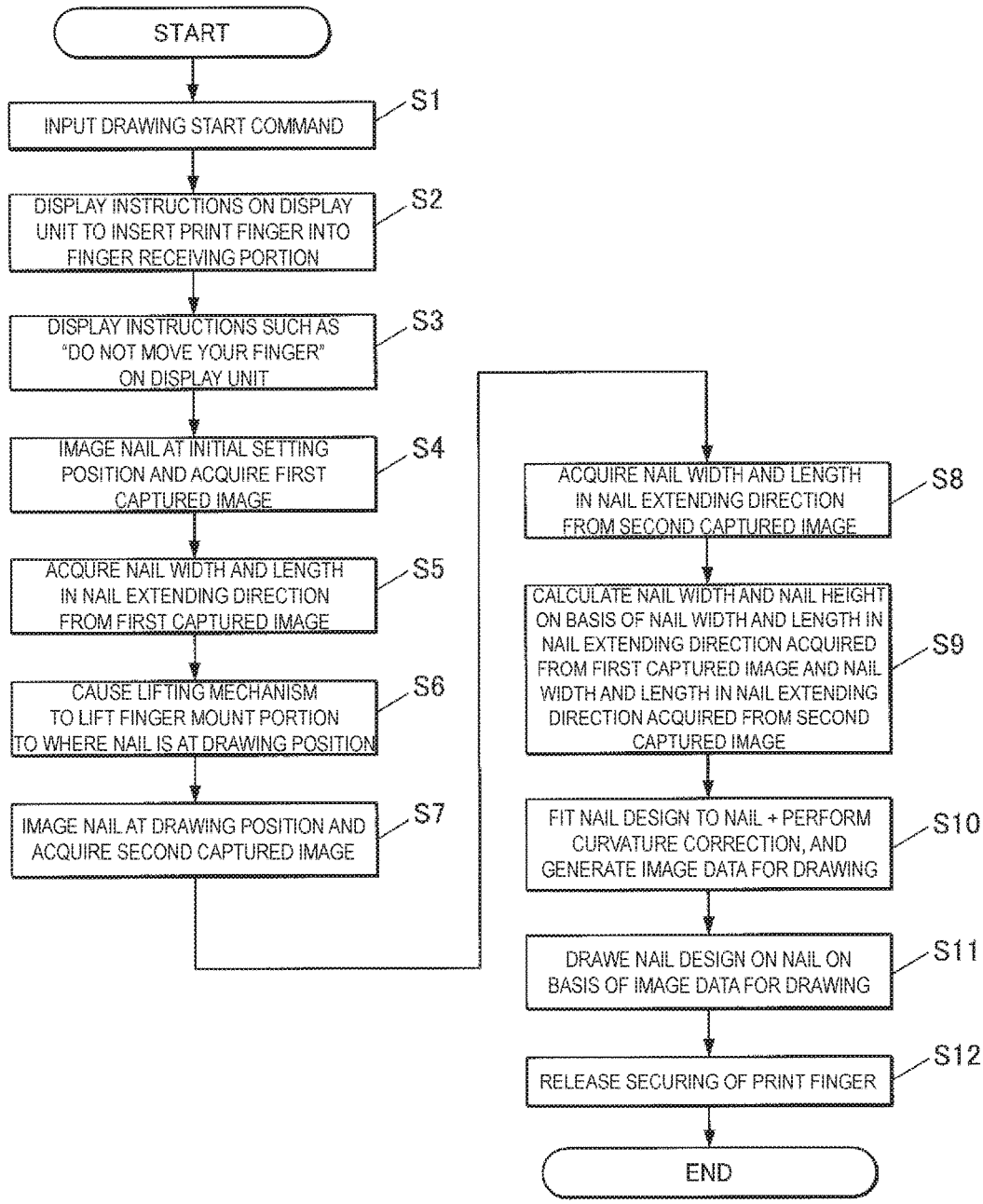
FIG. 8 is a flowchart illustrating drawing processing of the drawing apparatus according to the embodiment of the present invention.

Next, a drawing method by the nail printing apparatus (the drawing apparatus) 1 according to the present embodiment is described while referencing FIG. 8.

In cases where performing drawing by using the nail printing apparatus 1, a user first operates a power switch to turn on the control device 80.

The display control portion 817 causes a design selection screen to be displayed on the display unit 26, and the user operates operation buttons or the like on the operation unit 25 and selects a desired nail design from among a plurality of nail designs displayed on the design selection screen.

As a result, a selection command signal is output from the operation unit 25 and the nail design intended to be drawn on the nail T is selected.

Upon operation by a user of a draw switch or other operation button or the like of the operation unit 25, a command signal is output from the operation unit 25 and a drawing start command is input to the control device 80 (step S1).

Upon input of the drawing start command, the display control portion 817 causes instructions to insert the print finger U1 in the finger receiving portion 31 to be displayed on the display unit 26 (step S2).

The user follows the displayed instructions and inserts the print finger U1 into the finger receiving portion 31.

Specifically, the user mounts the print finger U1 on the plate member 331 of the finger mount portion 33, and also mounts the free end portion of the nail T on the nail placement portion 332, thus stabilizing the position of the nail T. While in this state, the nail T is disposed at the initial setting position.

Furthermore, the display control portion 817 causes instructions such as, "Do not move your finger" to be displayed on the display unit 26 (step S3).

Then, while the nail T is disposed at the initial setting position in this manner, the imaging control portion 811 causes the imaging unit 50 to image the nail T at the initial setting position and acquire the first captured image (step S4).

Upon acquisition of the first captured image, the nail information acquisition portion 812 acquires a distance (the length dimension of the nail width; w1 in FIG. 5A) in the width direction of the nail T, and a distance (the length dimension; v1 in FIG. 5B) in the length direction of the nail T from the first captured image (step S5).

Next, the lifting control portion 813 causes the lifting mechanism 34 to lift the finger mount portion 33 to where the nail T is at the drawing position (step S6).

When the finger mount portion 33 is lifted, the top surface of the print finger U1 abuts against the bottom surface of the finger holding portion 311. The lifting of the finger mount portion 33 by the lifting mechanism 34 is stopped by the print finger U1 abutting against the finger holding portion 311.

While in this state, as illustrated in FIG. 2B, the nail T is disposed at the height of the drawing position. The height position of the nail T at this time is the recognition reference position RP of the imaging device 51.

Then, while the nail T is disposed at the drawing position in this manner, the imaging control portion 811 causes the imaging unit 50 to image the nail T at the drawing position and acquire the second captured image (step S7).

Upon acquisition of the second captured image, the nail information acquisition portion 812 acquires a distance (the length dimension of the nail width; w2 in FIG. 5A) in the width direction of the nail T, and a distance (the length dimension; V in FIG. 5B) in the length direction of the nail T from the second captured image (step S8).

Furthermore, the nail information acquisition portion 812 calculates the actual width dimension of the nail T and the height h of the nail T on the basis of the distance/nail length in the width direction of the nail acquired from the first captured image and the distance/nail length in the width direction of the nail acquired from the second captured image (step S9).

The nail information acquisition portion 812 acquires the curvature of the nail on the basis of the calculated height of the nail T.

Note that the curvature acquired by the nail information acquisition portion 812 may serve to classify the nail T into multiple curvature patterns on the basis of the height of the nail T.

The nail information acquisition portion 812 acquires the shape (coordinates of the outline) and the like of the nail T on the basis of the first captured image and the second captured image.

The various nail information acquired by the nail information acquisition portion 812 is stored in the nail information memory region 822.

Next, the drawing data generation portion 815 generates drawing-use data (drawing data for the nail design) for drawing a nail design selected by the user on the nail T of the user, on the basis of the nail information acquired by the nail information acquisition portion 812 (step S10).

Specifically, the drawing data generation portion 815 performs fitting of the nail design to the nail T on the basis of the actual width dimension of the nail T, the shape of the nail T, and the like acquired by the nail information acquisition portion 812. The drawing data generation portion 815 further performs curvature correction on the image data on the basis of the curvature pattern classified by the nail information acquisition portion 812 or on the basis of the height of the nail T itself.

Upon generation of the drawing-use data, the drawing control portion 816 exports the drawing-use data to the drawing mechanism 40 and causes the head movement portion 49 to operate and perform the drawing processing for applying the drawing to the nail T using the pen 41 by appropriately moving the drawing head 43 (step S11).

Then, upon completion of the drawing processing for that nail, the lifting control portion 813 causes the lifting mechanism 34 to lower the finger mount portion 33 to where the nail T is at the initial setting position, which releases the securing of the print finger (step S12).

As a result, the user can pull the print finger U1 out from the device.

According to the present embodiment, in a case where the recognition reference position of the imaging unit 50 is set at a position separated a predetermined distance from the imaging device 51 of the imaging unit 50 as described above, the nail T is held on the finger mount portion 33 at the first position and the second position which have different distances from the recognition reference position of the imaging unit 50. Moreover, the first captured image and the second captured image are acquired by using the imaging unit 50 and imaging the nail T in a state where held at the first position and a state where held at the second position from the same imaging position; and the nail information acquisition portion 812 acquires the three-dimensional shape of the nail T on the basis of the first captured image and the second captured image.

As a result, unlike cases such as when finding the three-dimensional shape of an object using a light sectioning method, the three-dimensional shape of the nail T can be accurately acquired using existing components of the nail printing apparatus 1 without a special mechanism.

As such, the information indicating the three-dimensional shape of the nail T can be acquired by a simple and inexpensive configuration, and recognition of the nail shape, curvature correction, and the like can be performed with high accuracy.

The nail information acquisition portion 812 of the present embodiment acquires the apparent distance in the first captured image at the recognition reference position, from the position of one edge in the width direction of the nail T to the predetermined position, and the apparent distance in the second captured image at the recognition reference position, from the position of one edge in the width direction of the nail T to the predetermined position; and also acquires the apparent distance in the first captured image at the recognition reference position, from the position of one edge in the length direction of the nail T to the predetermined position, and the apparent distance in the second captured image at the recognition reference position, from the position of one edge in the length direction of the nail T to the predetermined position; and calculates the actual nail width of the nail T and the height of the nail T using these acquisition results in a triangulation method.

Thus, recognition of the nail shape, curvature correction, and the like can be simply performed with high accuracy by only capturing two images, namely the first captured image and the second captured image.

In the present embodiment, the first position is the initial setting position, and the second position is the drawing position for when the drawing mechanism 40 performs the drawing.

Thus, the images needed to perform the acquisition of the shape of the nail T can be acquired in the flow of a series of processes, namely, setting the print finger U1, lifting the position of the nail T to the drawing position, and performing the drawing processing; and rapid and smooth drawing processing can be performed.

In the present embodiment, the holding portion that holds the nail T at the predetermined position, namely the finger mount portion 33, includes the nail placement portion 332 on which the free end portion of the nail T is mounted and that positions the nail T; and is configured so as to be capable of taking a position at which the surface of the nail T is held at the first position, and a position at which the surface of the nail T is held at the second position, while the nail T is positioned by the nail placement portion 332.

Thus, the position of the nail T can be stabilized and the position of the nail T is not likely to become offset between the first captured image and the second captured image. As a result, acquisition of the nail shape and the like can be performed with greater accuracy.

The embodiment described above is for the purpose of elucidating the present invention and is not to be construed as limiting the present invention. The invention can of course be altered and improved without departing from the gist thereof.

For example, in the present embodiment, an example of a case is described in which only a portion of the nail width and the length in the length direction of the nail T is calculated. However, a configuration is possible in which the nail width of the entire nail T and the length in the length direction of the entire nail T is acquired.

In this case, the entire nail T may be acquired at once, or sequential acquisition of one portion at a time may be repeated such as, for example, acquiring the left half of the nail width as in the present embodiment, then acquiring the right half of the nail width, and then combining the two widths to obtain the nail width of the entire nail T.

Here, because the planar shape of the nail T has right-left symmetry in most cases, a configuration is possible in which either the left or right half is acquired as in the present embodiment, and then this half is doubled to acquire the value of the nail width of the entire nail T.

It is sufficient that the distance in the height direction from the recognition reference position of the imaging device 51 is different between the first position where the first captured image is captured and the second position where the second captured image is captured; and the first position and the second position are not necessarily limited to the setting position for the processing and the drawing position for when drawing is performed as in the present embodiment.

In the present embodiment, an example of a case is described in which the imaging device 51 and the illumination device 52 of the imaging unit 50 are fixedly disposed in the upper portion of the apparatus, and the first captured image and the second captured image are captured using this fixedly disposed imaging device 51. However, the imaging device 51 is not limited to being fixedly disposed.

For example, a configuration is possible in which the imaging device 51 and the illumination device 52 of the imaging unit 50 are mounted on the side or the like of the drawing head 43, and the imaging unit 50 is movable in the X and Y directions together with the drawing head by the head movement portion 49 of the drawing mechanism 40.

For example, a mechanism for moving the imaging unit 50 may be provided separately from the mechanism for moving the drawing head 43.

Thus, in cases where performing imaging using an imaging device that is movably configured, the imaging device 51 is disposed at the same imaging position and imaging is performed such that the imaging positions when capturing the first captured image and the second captured image do not deviate.

In the present embodiment, an example of a case is described in which the first captured image and the second captured image are captured one at a time as still images. However, a configuration is possible in which the imaging device captures a moving picture.

In this case, a frame at which the first position is captured is extracted from the moving picture as the first captured image and a frame at which the second position is captured is extracted from the moving picture as the second captured image.

In the present embodiment, a configuration is described in which the nail placement portion 332 is provided on the finger mount portion 33, and the nail placement portion 332 is lifted and lowered when the finger mount portion 33 is lifted and lowered by the lifting mechanism 34. However, the configuration of the nail placement portion 332 nail placement is not limited thereto.

For example, the nail placement portion may be provided as a member separate from the finger mount portion 33.

Additionally, the nail placement portion may be fixedly disposed at the height of the drawing position that is the same height as the recognition reference position of the imaging unit 50.

Note that the nail placement portion need not be provided, and configurations are possible in which the nail placement portion is not provided.

In the present embodiment, an example of a case is described in which the lifting mechanism 34 that lifts and lowers the holding portion, namely the finger mount portion 33, is a push-pull solenoid or the like disposed below the finger mount portion 33. However, the lifting mechanism is not limited thereto.

For example, a configuration is possible in which an airbag system is used in which a fluid such as air or the like is supplied upon operation of a switch, the airbag expands, and the finger mount portion 33 is pressed up.

The finger mount portion 33 itself may be constituted by, for example, an expandable member such as an airbag, and lift and lower while holding the print finger U1. In this case, the finger mount portion and the lifting mechanism are integrally formed.

A configuration is possible in which a sensor that detects that the print finger U1 is mounted on the finger mount portion 33 and that the nail T is disposed at the first position, a sensor that detects that the nail T is disposed at the first position, and the like are provided in order to detect the timing of the imaging by the imaging device 51. In this configuration, the acquisition (imaging operations) of the first captured image and the second captured image by the imaging device 51 is performed upon receiving the detection results of these sensors.

In the present embodiment, a configuration is described in which the drawing head 43 of the nail printing apparatus (the drawing apparatus) 1 is provided with the pen holder 42 that holds the pen 41 for drawing and the ink jet head 71. However, providing both the pen 41 and the ink jet head 71 is not a required configuration and the drawing apparatus may be configured to draw using only the pen 41 or the ink jet head 71.

In the present embodiment, an example of a case is described in which the drawing head 43 is provided with one pen holder 42. However, the number of pen holders 42 provided in the drawing head 43 is not limited to one. For example, a configuration is possible in which two or more pen holders 42 are provided and two or more pens 41 for drawing are held.

In the present embodiment, an example of a case is described in which the user manually appropriately replaces the pen 41 held in the pen holder 42. However, for example, a configuration is possible in which standby space for causing pens 41 to stand by is provided in the home area 60 or the like, a required pen 41 is automatically acquired from within the standby space by a pen replacing mechanism (not illustrated), and this pen 41 is placed in the pen holder 42.

In the present embodiment, an example has been given of the nail printing apparatus 1 in which fingers are inserted into the apparatus one finger at a time and drawing is performed sequentially. However, a configuration is possible in which consecutive drawing can be performed on a plurality of fingers, without the need to insert and remove each finger.

In the present embodiment, an example of a case is described in which the nail printing apparatus 1 is provided with the dryer 90 that includes the heater 91 and the fan 92. However, a configuration is possible in which the nail printing apparatus 1 is not provided with the dryer 90.

For example, the dryer 90 need not be provided in cases where the ink dries relatively quickly, such as when the nail printing apparatus 1 includes only an ink jet printing head or the like.

The embodiments described above are not to be construed as limiting the scope of the present invention and include the scope of the invention recited in the claims and equivalents.

The invention claimed is:

1. A drawing apparatus, comprising;
a drawing mechanism configured to perform drawing on a nail of an object being a finger or a toe; and
a processor,
wherein the processor:
acquires a first captured image of the nail and a second captured image of the nail, the first captured image and the second captured image being images captured from a first direction by an imaging device located at a position along the first direction from a first location of a surface of the nail, the first direction being a direction along an optical axis of the imaging device, the first captured image being an image captured by the imaging device in a state where a distance along the first direction between the imaging device and the first location of the surface of the nail is a first distance, and the second captured image being an image captured by the imaging device in a state where a distance along the first direction between the imaging device and the first location of the surface of the nail is a second distance different from the first distance; and
acquires a value of a width of the nail at the first location of the surface of the nail based on the first captured image and the second captured image,
wherein the processor acquires the value of the width of the nail based on a distance obtained from each of the first captured image and the second captured image along a width direction of the nail, the distance being a distance between a first surface position of the surface of the nail along the optical axis of the imaging device, and an edge of the surface of the nail along the width direction of the nail from the first surface position.

2. The drawing apparatus according to claim 1, wherein the processor acquires, based on the first captured image and the second captured image, a distance along the first direction between the first surface position and the edge of the surface of the nail as a value of a height of the nail.

3. The drawing apparatus according to claim 2, wherein the processor:
acquires, in the first captured image, a position of a first edge of the nail along the width direction from a position corresponding to the first surface position, and a position of a second edge of the nail along a length direction of the nail from the position corresponding to the first surface position, at which a position along the first direction is different from the position of the first edge;
acquires, in the second captured image, a position of a third edge of the nail along the width direction from the position corresponding to the first surface position, and a position of a fourth edge of the nail along the length direction of the nail from the position corresponding to the first surface position, at which a position along the first direction is different from the position of the third edge; and
acquires the value of the width of the nail and the value of the height of the nail based on the position of the first edge, the position of the second edge, the position of the third edge, and the position of the fourth edge.

4. The drawing apparatus according to claim 1, wherein:
a position of the imaging device when the imaging device images the nail and acquires the first captured image, and a position of the imaging device when the imaging device images the nail and acquires the second captured image, are set to be a same position; and
the drawing apparatus further includes:
a receiving portion into which the object is receivable, the receiving portion comprising a plate member which supports the object when the object is received in the receiving portion, and the plate member being movable along the first direction such that the nail is selectively held at one of a first position where the first location of the surface of the nail is at a position where a distance along the first direction between the first location of the surface of the nail and a preset reference position has a first value, and a second position where the first location of the surface of the nail is at a position where the distance along the first direction between the first location of the surface of the nail and the preset reference position has a second value different from the first value.

5. The drawing apparatus according to claim 4, wherein:
the first position is an initial setting position for receiving the object into the receiving portion, where the distance along the first direction between the imaging device and the first location of the surface of the nail is greater than the distance along the first direction between the imaging device and the first location of the surface of the nail at the second position; and
the second position is a drawing position for when the drawing mechanism performs the drawing on the nail.

6. The drawing apparatus according to claim 4, wherein:
the plate member comprises a nail placement portion on which a free end portion of the nail is mounted and the nail is positioned; and
the nail remains positioned by the nail placement portion when the nail is selectively held at the first position and the second position.

7. A drawing method for a drawing apparatus, the drawing apparatus comprising a processor and a drawing mechanism configured to perform drawing on a nail of an object being a finger or a toe, the drawing method being performed under control of the processor, and the drawing method comprising:
acquiring a first captured image of the nail and a second captured image of the nail, the first captured image and the second captured image being images captured from a first direction by an imaging device located at a position along the first direction from a first location of a surface of the nail, the first direction being a direction along an optical axis of the imaging device, the first captured image being an image captured by the imaging device in a state where a distance along the first direction between the imaging device and the first location of the surface of the nail is a first distance, and the second captured image being an image captured by the imaging device in a state where a distance along the first direction between the imaging device and the first location of the surface of the nail is a second distance different from the first distance; and
acquiring a value of a width of the nail at the first location of the surface of the nail based on a distance obtained from each of the first captured image and the second captured image along a width direction of the nail, the distance being a distance between a first surface position of the surface of the nail along the optical axis of the imaging device, and an edge of the surface of the nail along the width direction of the nail from the first surface position.

8. The drawing method according to claim 7, further comprising acquiring, based on the first captured image and the second captured image, a distance along the first direction between the first surface position and the edge of the surface of the nail as a value of a height of the nail.

9. The drawing method according to claim 8, wherein the acquiring the value of the width of the nail and the value of the height of the nail comprises:
acquiring, in the first captured image, a position of a first edge of the nail along the width direction from a position corresponding to the first surface position, and a position of a second edge of the nail along a length direction of the nail from the position corresponding to the first surface position, at which a position along the first direction is different from the position of the first edge;
acquiring, in the second captured image, a position of a third edge of the nail along the width direction from the position corresponding to the first surface position, and a position of a fourth edge of the nail along the length direction of the nail from the position corresponding to the first surface position, at which a position along the first direction is different from the position of the third edge; and
acquiring the value of the width of the nail and the value of the height of the nail based on the position of the first edge, the position of the second edge, the position of the third edge, and the position of the fourth edge.

10. The drawing method according to claim 7, wherein:
a position of the imaging device when the imaging device images the nail and acquires the first captured image, and a position of the imaging device when the imaging device images the nail and acquires the second captured image, are set to be a same position;
the drawing apparatus further includes:
a receiving portion into which the object is receivable, the receiving portion comprising a plate member which supports the object when the object is received in the receiving portion, and the plate member being movable along the first direction such that the nail is selectively held at one of a first position where the first location of the surface of the nail is at a position where a distance along the first direction between the first location of the surface of the nail and a preset reference position has a first value, and a second position where the first location of the surface of the nail is at a position where the distance along the first direction between the first location of the surface of the nail and the preset reference position has a second value different from the first value; and
the drawing method further comprises:
controlling the plate member such that the nail is held at the first position when the imaging device images the nail and acquires the first captured image; and
controlling the plate member such that the nail is held at the second position when the imaging device images the nail and acquires the second captured image.

11. The drawing method according to claim 10, wherein:
the first position is an initial setting position for receiving the object into the receiving portion, where the distance along the first direction between the imaging device and the first location of the surface of the nail is greater than the distance along the first direction between the imaging device and the first location of the surface of the nail at the second position; and the second position is a drawing position for when the drawing mechanism performs the drawing on the nail.

12. A drawing apparatus, comprising:
a drawing mechanism configured to perform drawing on a nail of an object being a finger or a toe;
a non-movable camera located at a position along a first direction from a first location of a surface of the nail, the non-movable camera being configured to capture an image of the nail;
a receiving portion comprising a plate member configured to selectively support the object, when the object is received in the receiving portion, at one of a first position at which the first location of the surface of the nail is at a position where a distance along the first direction between the first location of the surface of the nail and a preset reference position has a first value, and a second position where the first location of the surface of the nail is at a position where the distance along the first direction between the first location of the surface of the nail and the preset reference position has a second value different from the first value; and
a processor,
wherein the processor:
acquires a first captured image of the nail and a second captured image of the nail, the first captured image being an image captured by the camera in a state where a distance along the first direction between the camera and the first location of the surface of the nail is a first distance, and the second captured image being an image captured by the camera in a state where a distance along the first direction between the camera and the first location of the surface of the nail is a second distance different from the first distance; and
acquires a value of a width of the nail at the first location of the surface of the nail based on the first captured image and the second captured image.

13. The drawing apparatus according to claim 12, wherein:
the first position is an initial setting position for receiving the object into the receiving portion, where the distance along the first direction between the camera and the first location of the surface of the nail is the first distance; and
the second position is a drawing position for performing the drawing on the nail by the drawing mechanism, where the distance along the first direction between the camera and the first location is the second distance, the second distance being smaller than the first distance.

14. The drawing apparatus according to claim 12, wherein:
the plate member comprises a nail placement portion on which a free end portion of the nail is mounted and the nail is positioned; and
the nail remains positioned by the nail placement portion when the object is supported by the plate member at each of the first position and the second position.

\* \* \* \* \*